(12) United States Patent
Tengler et al.

(10) Patent No.: US 7,668,644 B2
(45) Date of Patent: Feb. 23, 2010

(54) VEHICLE FUEL INFORMATIONAL SYSTEM

(75) Inventors: Steve Tengler, Grosse Pointe Park, MI (US); Ronald Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 818 days.

(21) Appl. No.: 11/314,179

(22) Filed: Dec. 22, 2005

(65) Prior Publication Data

US 2007/0150171 A1 Jun. 28, 2007

(51) Int. Cl.
*G06F 19/00* (2006.01)
*G06G 7/70* (2006.01)
*G06G 7/76* (2006.01)

(52) U.S. Cl. .................. 701/123; 701/36; 701/200; 701/201; 701/209; 701/213; 340/450.2; 340/988; 705/26

(58) Field of Classification Search ................ 700/282; 701/29, 30, 36, 200, 123; 200/190; 340/450, 340/988; 73/290 R; 137/386
See application file for complete search history.

(56) References Cited

U.S. PATENT DOCUMENTS

| | | | | |
|---|---|---|---|---|
| 5,568,390 A | * | 10/1996 | Hirota et al. | 701/201 |
| 6,078,850 A | * | 6/2000 | Kane et al. | 701/29 |
| 6,128,571 A | * | 10/2000 | Ito et al. | 701/201 |
| 6,484,088 B1 | * | 11/2002 | Reimer | 701/123 |
| 6,505,165 B1 | * | 1/2003 | Berstis et al. | 705/1 |
| 6,654,684 B2 | * | 11/2003 | Shinada et al. | 701/211 |
| 6,668,227 B2 | * | 12/2003 | Hamada et al. | 701/208 |
| 6,965,872 B1 | * | 11/2005 | Grdina | 705/26 |
| 2002/0169547 A1 | * | 11/2002 | Harada | 701/211 |
| 2004/0059498 A1 | * | 3/2004 | Chinomi et al. | 701/200 |
| 2004/0160313 A1 | * | 8/2004 | McCarthy et al. | 340/425.5 |
| 2005/0149250 A1 | * | 7/2005 | Isaac | 701/200 |
| 2006/0058955 A1 | * | 3/2006 | Mehren | 701/209 |
| 2007/0290039 A1 | * | 12/2007 | Pfleging et al. | 235/384 |

\* cited by examiner

*Primary Examiner*—Khoi Tran
*Assistant Examiner*—Jaime Figueroa
(74) *Attorney, Agent, or Firm*—Global IP Counselors, LLP

(57) ABSTRACT

A vehicle fuel informational system is provided with a fuel level determination component, an onboard vehicle positioning component, an onboard vehicle navigation component and a low fuel notification component. The fuel level determination component determines a fuel level of a host vehicle equipped with the vehicle fuel informational system. The onboard vehicle positioning component determines a host vehicle's position of the host vehicle equipped with the vehicle positioning component. The onboard vehicle navigation component provides vehicle route information for a desired vehicle route of the host vehicle. The low fuel notification component provides a low fuel alert notification that is indicative of a low fuel and automatically recommends a suggested fuel provider at least partially based on at least one of the host vehicle's position of the host vehicle and the desired vehicle route.

26 Claims, 7 Drawing Sheets

VEHICLE FUEL INFORMATIONAL SYSTEM

BACKGROUND OF THE INVENTION

1. Field of the Invention

The present invention generally relates to a vehicle fuel informational system. More specifically, the present invention relates to using a vehicle communication system to obtain information about fueling stations.

2. Background Information

Recently, vehicles are being equipped with a variety of informational systems such as navigation systems, Sirius and XM satellite radio systems, two-way satellite services, built-in cell phones, DVD players and the like. These systems are sometimes interconnected for increased functionality. Also various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Presently, the vehicle navigation system and the fuel system are separate systems that operate independently of each other. Thus, when the vehicle is low on fuel, the driver must notice that the fuel gauge indicates the fuel tank is low. Some vehicles are provided with other warning systems for informing the driver that the fuel tank is low. In such an event, the driver then must find a nearby fuel provider. If the vehicle is equipped with a navigation system, then the driver will need to operate the navigation system to provide a list of the nearby fuel providers. If the navigation system is in use, this will result in the driver interrupting the programmed route. Once the navigation system lists the nearby fuel providers, the navigation system typically only provides route related information. The navigation system typically does not provide any current information on the current fuel pricing of the nearby fuel providers.

In view of the above, it will be apparent to those skilled in the art from this disclosure that there exists a need for an improved vehicle fuel informational system. This invention addresses this need in the art as well as other needs, which will become apparent to those skilled in the art from this disclosure.

SUMMARY OF THE INVENTION

It has been discovered that in recent years, numerous non-safety applications with the vehicle-to-vehicle and vehicle-to/from-infrastructure communications using DSRC technology have been proposed. However, this technology has not been linked to the navigation system and the fuel system of the vehicle to notify the driver of suggested fuel providers when the fuel level is low. Presently, the navigation system and the fuel system are separate systems that operate independently of each other. In other words, present navigation systems and fuel systems operate separately, and have little influence over each other's domain of control. If the user notices a low fuel tank, he interrupts the programmed route and requests a list of nearby gasoline stations. All actions require human intervention, understanding, and awareness; no actions are automatic. In view of this situation, the present invention was conceived.

One object of the present invention is to provide a vehicle fuel information system that interconnects the navigation system and the fuel system together so that the user is alerted to a low fuel situation and a suggested fuel provider is automatically suggested.

The forgoing object can basically be attained by providing a vehicle fuel informational system that comprises a fuel level determination component, an onboard vehicle positioning component, an onboard vehicle navigation component and a low fuel notification component. The fuel level determination component is configured to determine a fuel level of a host vehicle equipped with the vehicle fuel informational system. The onboard vehicle positioning component is configured to determine a host vehicle's position of the host vehicle equipped with the vehicle positioning component. The onboard vehicle navigation component is configured to provide vehicle route information for a desired vehicle route of the host vehicle. The low fuel notification component is configured to provide a low fuel alert notification that is indicative of a low fuel and to recommend a suggested fuel provider at least partially based on at least one of the host vehicle's position of the host vehicle and the desired vehicle route.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
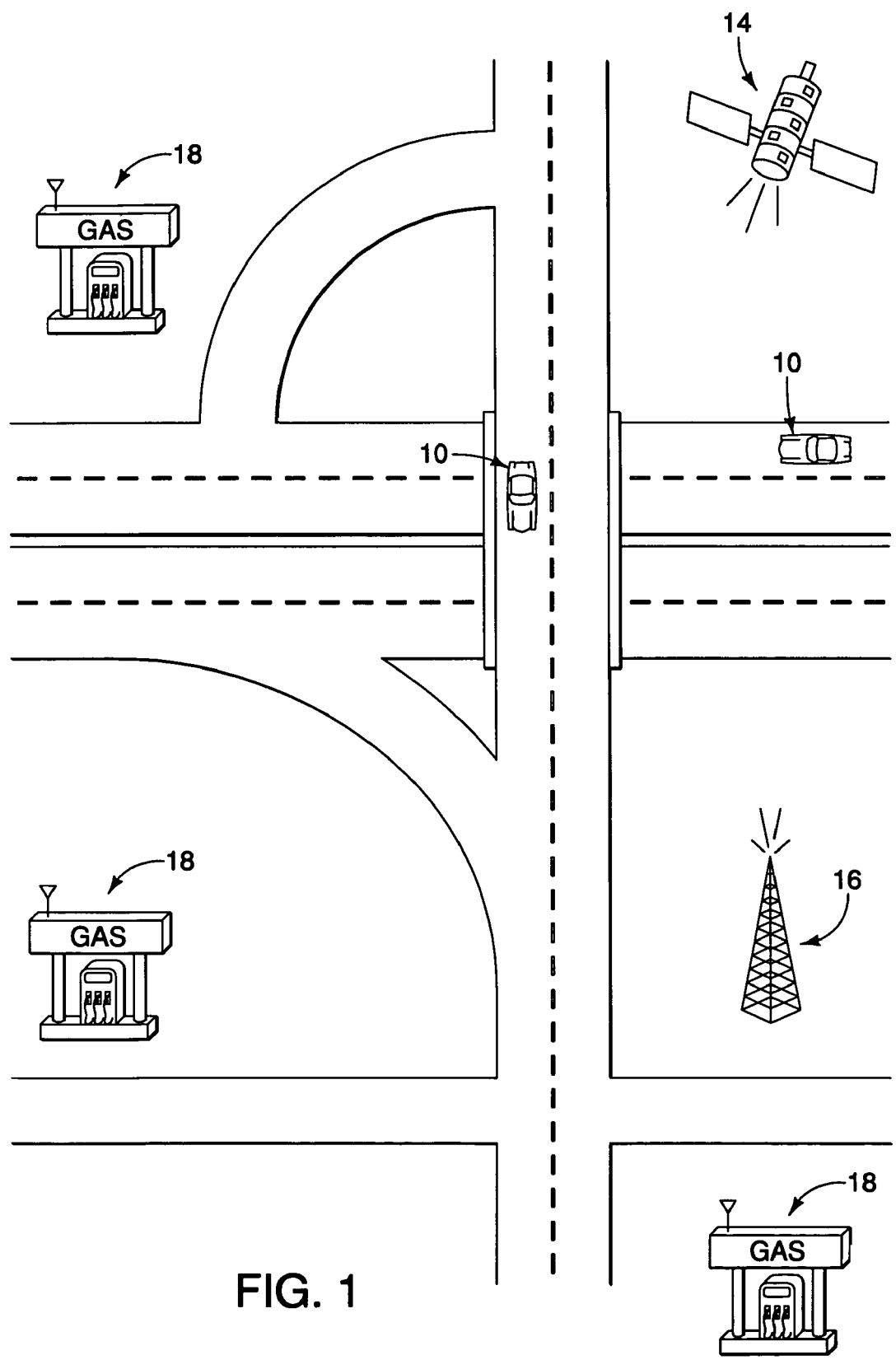
FIG. 1 is a pictorial representation of a two-way wireless communications (DSRC) network showing a vehicles equipped with an on-board unit capable of conducting two-way wireless communications with a plurality of fuel providers in accordance with the present invention.
Figure 2:
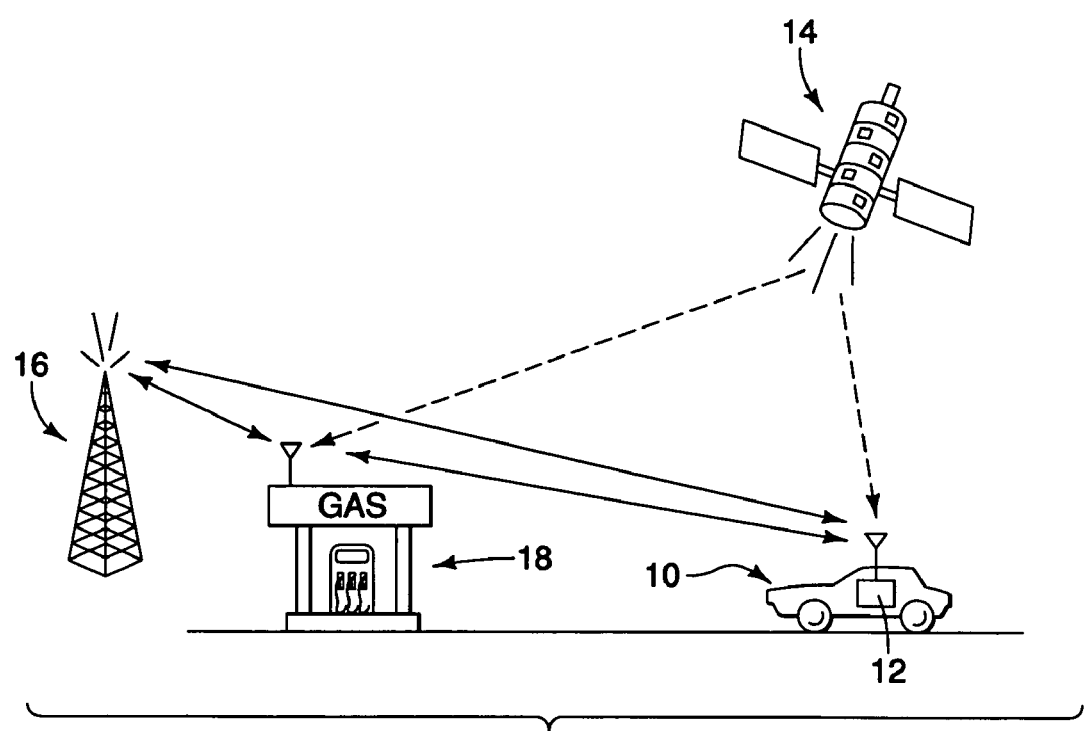
FIG. 2 is a pictorial representation of a two-way wireless communications (DSRC) network showing a vehicle communicating with one of the fuel providers via direct communications or via a satellite and/or a roadside unit in accordance with the present invention.

Referring initially to FIGS. 1 and 2, a two-way wireless communications network is illustrated in which a plurality of vehicles 10 that are each equipped with a vehicle communication system (on-board unit) 12 in accordance with one embodiment of the present invention. The two-way wireless communications network also includes one or more global positioning satellites 14 (only one shown) and one or more roadside units 16 (only one shown) that send and receive signals to and from the vehicles 10. The two-way wireless communications network further includes a plurality of fuel providers 18 (only two shown) that are configured and arranged to communicate with the vehicles 10 either directly or through the satellites 14 and/or the roadside units 16. In the preferred embodiment, the on-board units 12 of the vehicles 10 are preferably a dedicated short range communications (DSRC) on-board unit that can communicate with the roadside units 16 and the fuel providers 18 within the two-way wireless communications network. Thus, the roadside units 16 and the fuel providers 18 are configured and arranged with DSRC equipment that sends and receives signals to and from the vehicles 10. More specifically, each of the roadside units 16 and the fuel providers 18 is equipped with a DSRC unit for broadcasting and receiving signals to the vehicles 10 located within a prescribed communication (broadcasting/receiving) region surrounding the roadside units 16 and the fuel providers 18, respectively. Moreover, each of each of the roadside units 16 and the fuel providers 18 is preferably an IP enabled structure that is configured and arranged to establish a link between the vehicle on-board unit 12 of the host vehicle 10. Such DSRC units for the roadside units 16 and the fuel providers 18 can be conventional equipment that is known in the art. Since the roadside units 16 and the fuel providers 18 can be equipment that is known in the art, the structures of the roadside units 16 and the fuel providers 18 will not be discussed or illustrated in detail herein. Rather, it will be apparent to those skilled in the art from this disclosure that the equipment of the roadside units 16 and the fuel providers 18 can be any type of structure that can be used to carry out the present invention.

In this system, the term "host vehicle" refers to a vehicle among a group of DSRC equipped vehicles or vehicles equipped with two-way wireless communications in accordance with the present invention. The term "neighboring vehicle" refers to DSRC equipped vehicles or vehicles equipped with two-way wireless communications that are located within a communication (broadcasting/receiving) area surrounding the host vehicle in which the host vehicle is capable of either broadcasting a signal to another vehicle within a certain range and/or receiving a signal from another vehicle within a certain range. The term "neighboring roadside unit" refers to DSRC equipped roadside unit that is equipped with two-way wireless communications and that is located within a communication (broadcasting/receiving) area surrounding the host vehicle. The term "neighboring fuel provider" refers to DSRC equipped fuel provider that is equipped with two-way wireless communications and that is located within a communication (broadcasting/receiving) area surrounding the host vehicle in which the host vehicle.

Figure 3:
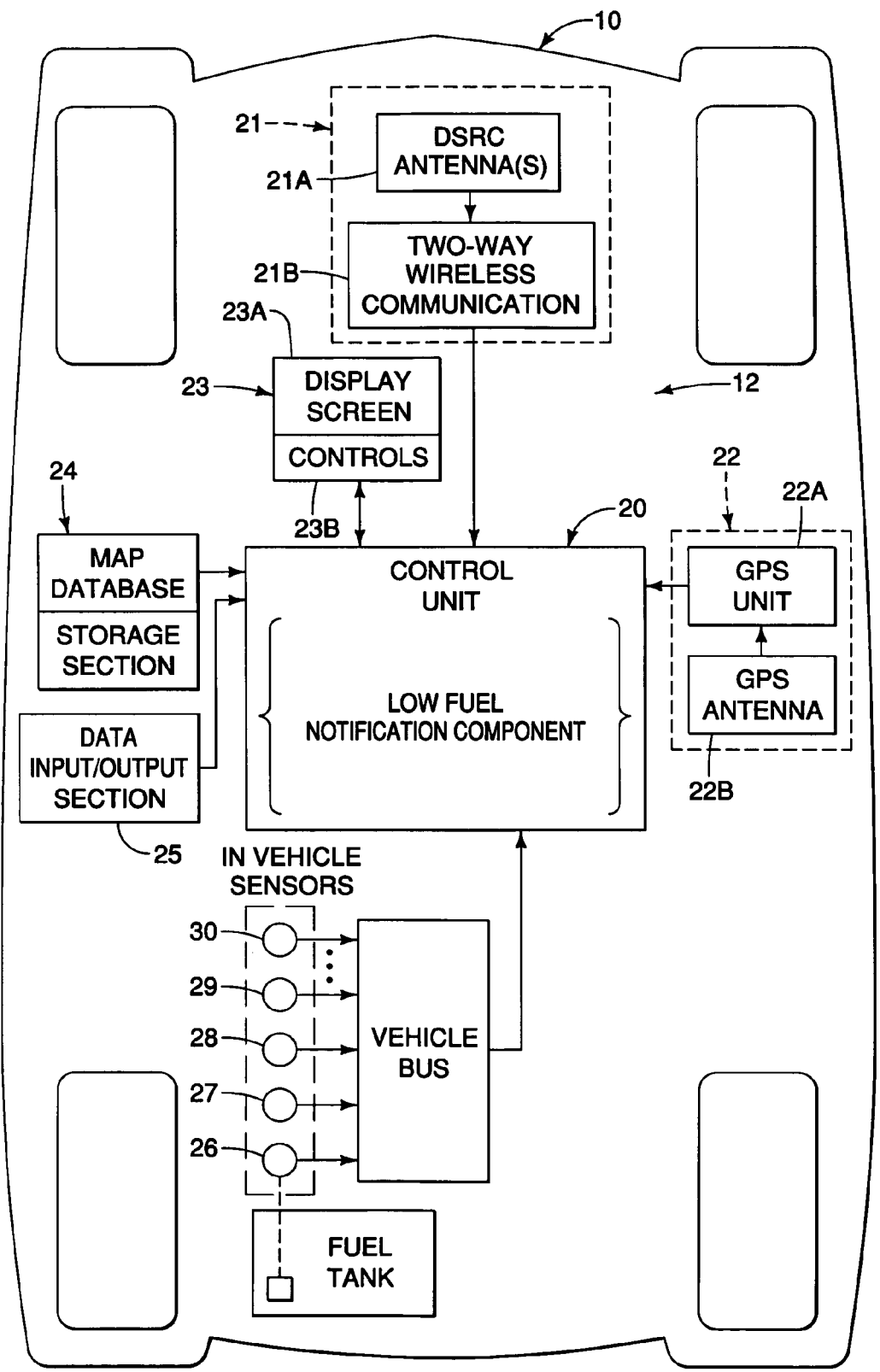
FIG. 3 is a schematic representation of a vehicle that is equipped with the on-board unit for conducting two-way wireless communications in accordance with the present invention.

Referring now to FIG. 3, the vehicle on-board unit (OBU) 12 of the present invention basically includes a controller or control unit 20, a two-way wireless communication system 21 (a short range wireless communication section), a global positioning system 22, an onboard vehicle navigation system 23, a map database storage section or component 24 and a data input/output section 25. These systems or components are configured and arranged such that the control unit 20 receives and/or sends various signals to other DSRC equipped component and systems in the communication (broadcasting/receiving) area that surrounds the host vehicle 10. Moreover, the control unit 20 of the vehicle on-board unit 12 is configured to receive detection signals from various in-vehicle sensors including, but not limited to, a fuel sensor 26, an ignition switch sensor 27, a steering angle sensor 28, a vehicle speed sensor 29, an acceleration sensor 30, etc. The vehicle on-board unit 12 together with the in-vehicle sensors 26 to 30 forms a vehicle fuel informational system.

Figure 4:
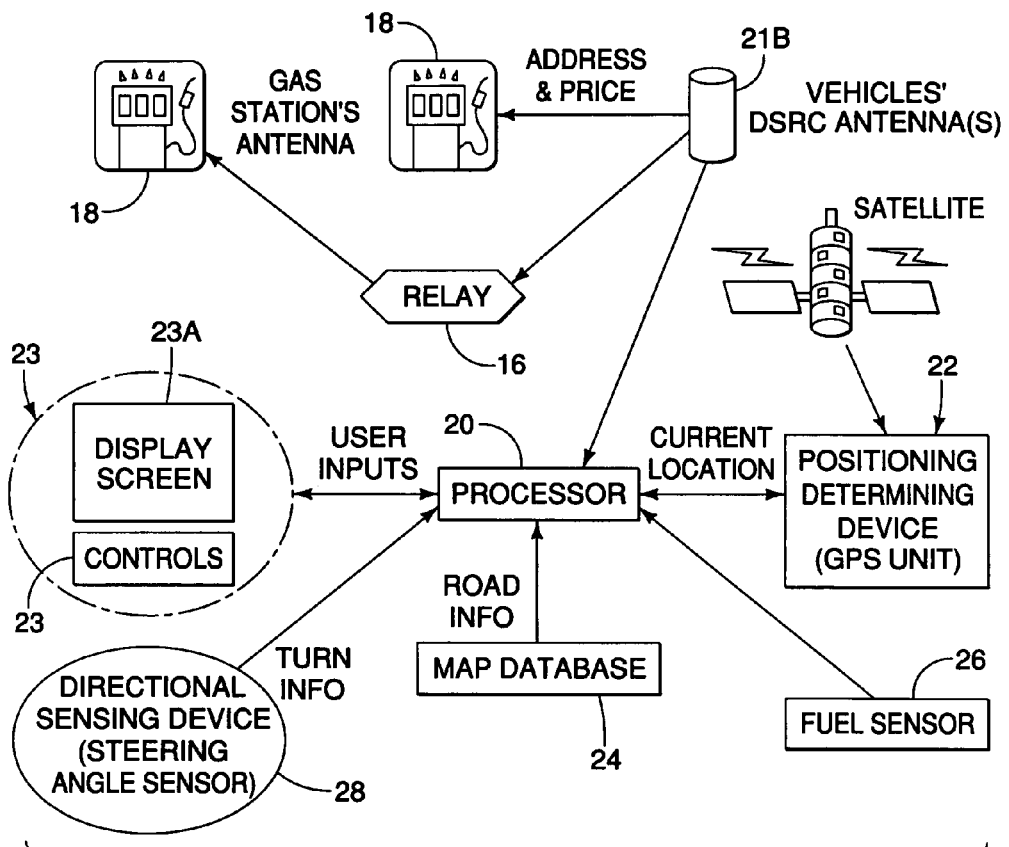
FIG. 4 is a schematic representation of a two-way wireless communications between a vehicle that is equipped with the on-board unit and fuel providers in accordance with the present invention.
Figure 5:
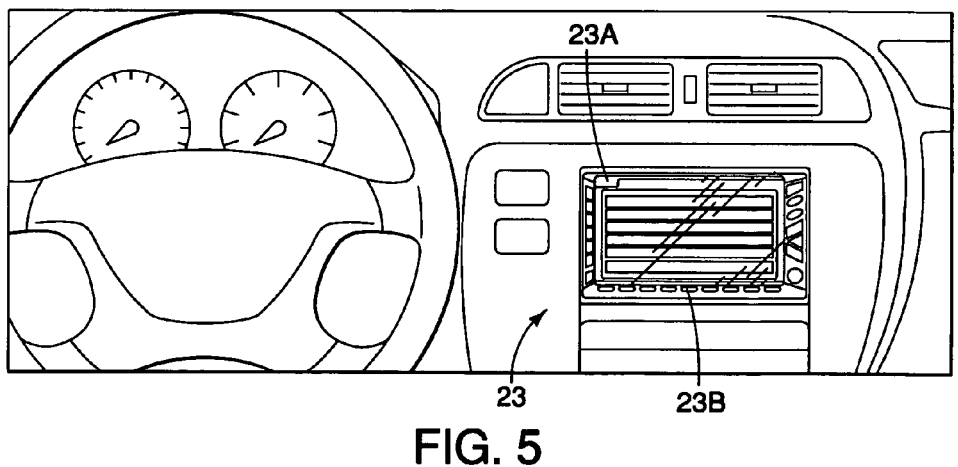
FIG. 5 is an inside elevational view of a portion of the vehicle's interior that is equipped with the on-board unit for conducting two-way wireless communications in accordance with the present invention.

Basically, the control unit 20 includes a program that functions as a low fuel notification component that produces a low fuel alert notification that is indicative of a low fuel and that automatically recommends a suggested fuel provider at least partially based on at least one of the host vehicle's position and the desired vehicle route. In particular, the control unit 20 is configured and/or programmed to carry out the low fuel alert notification and the suggested fuel provider recommendation by communicating as seen in the diagram of FIG. 4 and by executing the steps shown in the flow chart of FIG. 9 (discussed below). The control unit 20 and its various components will be typically activated when the user turns the ignition key to the "ON" position or the "Accessory" position. Thus, the ignition switch sensor 27 is configured and arranged to activate the control unit 20 and start the process of FIG. 9 (discussed below).

The control unit 20 preferably includes a microcomputer with a low fuel notification program and a fuel provider selection and recommendation program. The control unit 20 in one preferred embodiment is integrated into the navigation system 23 such that they share common inputs and outputs. In other words, the controls (inputs and outputs) for operating the navigation system 23 are also used to operate the vehicle communication system 12 to carry out the present invention. Alternatively, separate controls can be used for the vehicle communication system 12 and the navigation system 23. In any event, the control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communication system 21, the global positioning system 22, the navigation system 23 and the map database storage section 24 that are run by the processor(s). The control unit 20 is capable of selectively controlling other DSRC components of the vehicle such as other safety systems as needed and/or desired. It will be apparent to those skilled in the art from this disclosure that the precise structure and algorithms for the control unit 20 can be any combination of hardware and software that will carry out the functions of the present invention.

The two-way wireless communication system 21 includes communication interface circuitry that connects and exchanges information with a plurality of the vehicles 10 that are similarly equipped as well as with the roadside units 16 and the fuel providers 18 through a wireless network within the broadcast range of the host vehicle 10. The two-way wireless communication system 21 is configured and arranged to conduct direct two way communications between vehicles (vehicle-to-vehicle communications) and roadside units (roadside-to-vehicle communications). Moreover, two-way wireless communication system 21 is configured to periodically broadcast a signal in the broadcast area. Thus, the two-way wireless communication system 21 includes a regular broadcast channel to obtain general location information of the fuel providers 18 in the broadcast area and a service channel to obtain pricing information and other private data of the fuel providers 18 in the broadcast area. The two-way wireless communication system 21 is configured to use the service channel to conduct private communications with the fuel providers 18. In other words, an electronic handshake occurs between the host vehicle 10 and the fuel providers 18 once a low fuel situation occurs and one of the fuel providers 18 is selected.

As seen in FIG. 3, the two-way wireless communication system 21 is an on-board unit that includes a host vehicle two way communication device 21A and one or more antennas 21B. Preferably, the two-way wireless communication system 21 has both an omni-directional antenna and a multi-directional antenna. The host vehicle two way communication device 21A is configured to conduct direct short range communications in a host vehicle broadcast area surrounding the host vehicle 10 via the antennas 21B. In particular, the two-way wireless communication system 21 is preferably a dedicated short range communication systems, since the latency time between communications is very low compared to most other technologies that are currently available. However, other two-way wireless communication systems can be used if they are capable of conducting both point-to-point wireless communications and broadcast wireless messages in a limited broadcast area so long as the latency time between communications is short enough to carry out the present invention. When the two-way wireless communication system 21 is a DSRC system, the two-way wireless communication system 21 will transmit at a 75 Mhz spectrum in a 5.9 GHz band with a data rate of 1 to 54 Mbps, and a maximum range of about 1,000 meters. Preferably, the two-way wireless communication system 21 includes seven (7) non-overlapping channels. The two-way wireless communication system 21 will be assigned a Medium Access Control (MAC) address and/or an IP address so that each vehicle in the network can be individually identified.

The global positioning system 22 is a conventional global positioning system (GPS) that is configured and arranged to receive global positioning information of the host vehicle 10 in a conventional manner. Basically, the global positioning system 22 includes a GPS unit 22A that is a receiver for receiving a signal from the global positioning satellite 18 via a GPS antenna 22B. The signal transmitted from the global positioning satellite 14 is received at regular intervals (e.g. one second) to detect the present position of the host vehicle. The GPS unit 22A preferably has an accuracy of indicting the actual vehicle position within a few meters or less. This data (present position of the host vehicle) is fed to the control unit 20 for processing and to the navigation system 23 for processing.

As mentioned above, preferably, the vehicle on-board unit 12 of the present invention is integrated into the navigation system 23. The navigation system 23 is preferably a conventional navigation system that is configured and arranged to receive global positioning information of the vehicle 10 through a global positioning system (GPS) 22 based on the signals transmitted from the global positioning satellites 14. Preferably, inputting and displaying parts of the vehicle fuel informational system are built into the navigation system 23. Basically, the navigation system 23 includes a color display unit 23A and input controls 23B. The navigation system 23 can have its own controller with microprocessor and storage, or the processing for the navigation system 23 can be executed by the control unit 20. In either case, the signals transmitted from the global positioning satellites 14 are utilized to guide the vehicle 10 in a conventional manner.

Figure 6:
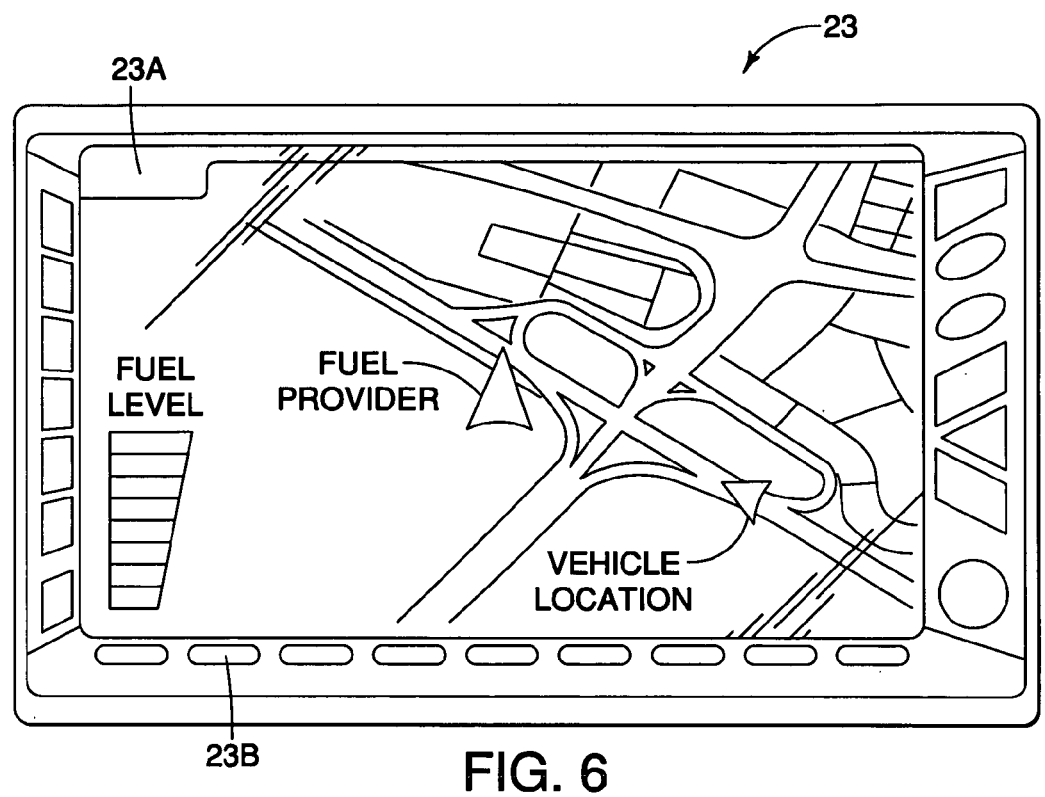
FIG. 6 is a pictorial representation of a navigation screen display of the vehicle's navigation system that is integrated with the on-board unit in accordance with the present invention.
Figure 7:
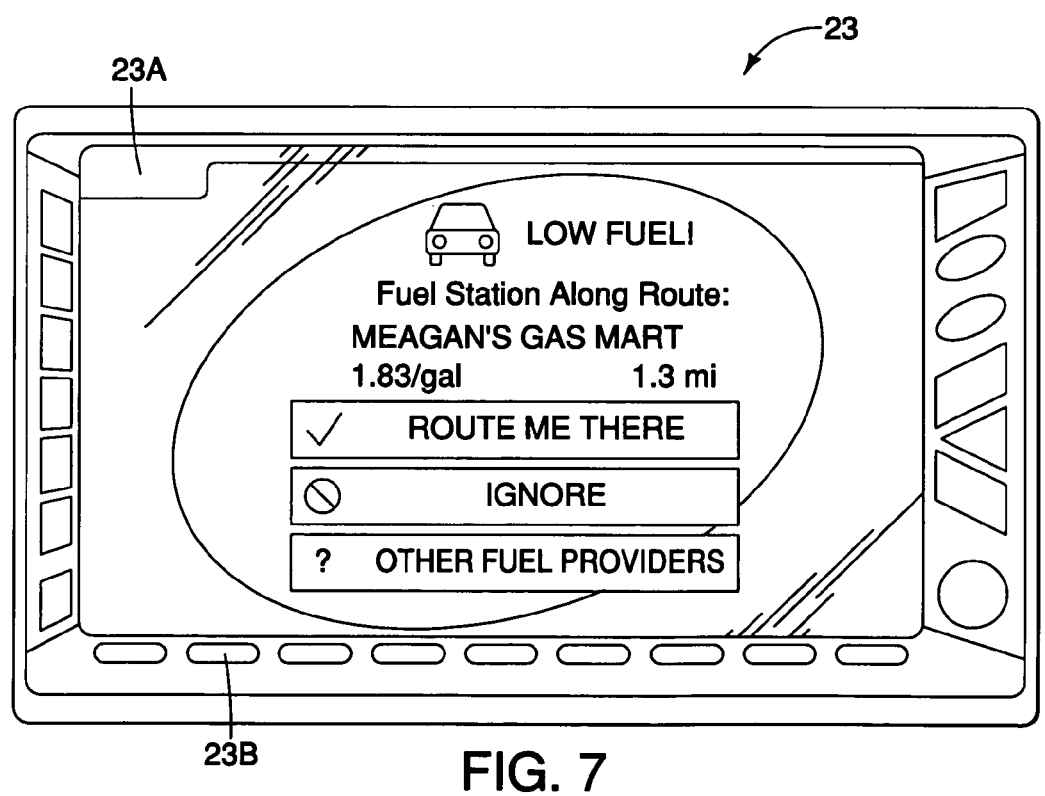
FIG. 7 is a pictorial representation of a low fuel/selected fuel provider screen display of the vehicle's navigation system that is integrated with the on-board unit in accordance with the present invention.

The navigation system 23 includes the functions of the navigational systems that are installed into vehicles, including, but not limited to, detecting, mapping, tracking and map-matching the location of the installed vehicle using the global positioning system 22, and the map database storage section 24. This map information is integrated with the fuel system as shown in FIG. 6. During a trip (which may be hours in length), the navigation system 23 will continue to give "next maneuver" instructions, until the control unit 20 determines that the fuel level has fallen below a prescribed level. Once the fuel level has fallen below a prescribed level, navigation system 23 displays a low fuel alert notification screen as shown in FIG. 7. The user instructs the navigation system 23 to route the host vehicle 10 to the selected fuel provider 18 as explained below. Alternatively, the user can ignore the low fuel alert notification and return to the regular navigational map screen as shown in FIG. 6 or select alternative fuel providers that are stored in the map database of the map database storage section 24. These alternative fuel providers include all fuel providers regardless of whether or not they can communicate with the host vehicle 10.

In the illustrated embodiment, the color display unit 23A constitutes an output part of the vehicle fuel informational system. The color display unit 23A is configured to display both navigational maps and data such as seen in FIG. 6 as well as display informational screens relating to the fuel level and fuel providers such as seen in FIG. 7. Since the low fuel notification component of the control unit 20 and the fuel provider selection of the control unit 20 are integrated into the navigation system 23, the navigational map can display the fuel level and the fuel providers 18 on the navigational map as seen in FIG. 6. Thus, the navigation system 23 can be utilized to automatically direct the host vehicle 10 to the fuel provider 18 that is selected.

Thus, the color display unit 23A is controlled by the control unit 20 to display the screens shown in FIGS. 6 and 7 as well as other screens that are not shown. Preferably, the color display unit 23A is a touch screen so that it also forms part of the vehicle fuel informational system. The input controls 23B also forms part of the vehicle fuel informational system. In other words, the color display unit 23A and the input controls 23B constitutes a host vehicle user input device that is manually operated by the user to setup the vehicle communication system 21 and to carry on communications with the fuel provider 18 that is selected via the host vehicle two way communication device 21A using the service channel.

The map database storage section 24 configured to store road map data as well as other data that can be associated with the road map data such as various landmark data, fueling station locations, restaurants, etc. The map database storage section 24 preferably includes a large-capacity storage medium such as a CD-ROM (Compact Disk-Read Only Memory) or IC (Integrated Circuit) card. The map database storage section 24 is configured to perform a read-out operation of reading out data held in the large-capacity storage medium in response to an instruction from the control unit 20 and/or the navigation system 23. The map database storage section 24 is used by the control unit 20 to acquire the map information necessary as needed and/or desired for locating the fuel providers 18 and guiding the host vehicle 10 to the fuel providers 18. The map database storage section 24 is also used by the navigation system 23 to acquire the map information necessary for route guiding, map display, and direction guide information display. Preferably, the map information of this embodiment includes the location of the fuel providers 18 and other information necessary for offering map information and route guiding as performed by a general navigation device and necessary for displaying the direction guide information of the embodiment.

The control unit 20 preferably uses one of two methods to select the fuel providers 18 that are initially potential candidates for refueling. In other words, the control unit 20 performs one of two calculations to determine whether or not one of the fuel providers 18 is "out of the way" or "out of the area". If the user has programmed a route into the navigation system 23, then the control unit 20 simply calculates the maximum distance from the known GPS location of the fuel providers 18 to any point along the recommended navigational route, and eliminates the fuel providers 18 from contention if the distance was above some nominal value (e.g. 2 miles).

Figure 8:
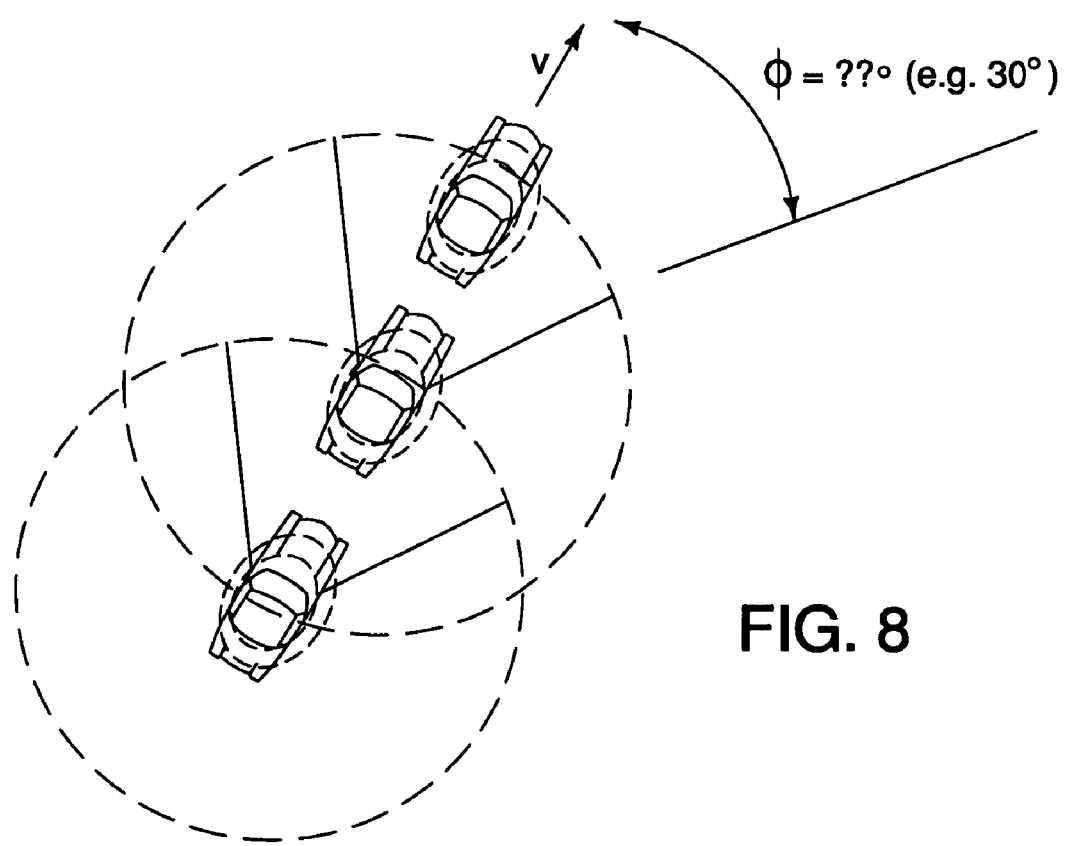
FIG. 8 is a pictorial representation of a vehicle utilizing a moving filter to preselect suggested fuel providers in accordance with the present invention.

Alternatively, as seen in FIG. 8, if there is no route programmed into the navigation system 23, then the control unit 20 uses a moving filter to initially select potential candidates for refueling. In the moving filter scenario, the control unit 20 of the host vehicle would look for the fuel providers 18 equipped with DSRC in the communication area, and then eliminate those fuel providers 18 that were in the opposite direction of motion. Then the control unit 20 calculates its present trajectory (given its own GPS information over time) using the formulas below, and look for an angle less than a nominal value (e.g. $\phi=30°$).

$$\alpha(a, b) = \left(\frac{1}{n}\left[\tan^{-1}\frac{(b_5 - b_4)}{(a_5 - a_4)} + \tan^{-1}\frac{(b_6 - b_5)}{(a_6 - a_5)} + \tan^{-1}\frac{(b_7 - b_6)}{(a_7 - a_6)} + \ldots + \tan^{-1}\frac{(b_n - b_{n-1})}{(a_n - a_{n-1})}\right]\right)$$

Where $\alpha(a, b)$=The averaged trajectory angle of "My Vehicle" versus longitudinal axis.
  a=My vehicle's longitude at time 4, 5, 6 . . .
  b=My vehicle's latitude at time 4, 5, 6 . . .
  n=Number of points being averaged.

$$\theta(c, d) = \left(\frac{1}{n}\left[\tan^{-1}\frac{(d_5 - d_4)}{(c_5 - c_4)} + \tan^{-1}\frac{(d_6 - d_5)}{(c_6 - c_5)} + \tan^{-1}\frac{(d_7 - d_6)}{(c_7 - c_6)} + \ldots + \tan^{-1}\frac{(d_6 - d_{n-1})}{(c_n - c_{n-1})}\right]\right)$$

where $\theta(c, d)$=The averaged trajectory angle of "My Vehicle" versus longitudinal axis.
  c=Potential gas station's longitude at time 4, 5, 6 . . .
  d=Potential gas station's latitude at time 4, 5, 6 . . .
  n=Number of points being averaged.

thereby yielding:

$\phi(x,y)$=angle between trajectory & gas station=absolute value($\theta(c,d)-\alpha(a,b)$)

Thus, the vehicle fuel information system recognizes the fuel providers 18 within the moving filter zone as being "on the way" and then would consider them as potential stops depending on other factors such as price and distance as explained below.

These same calculations and communications could be done at the beginning of a trip if the user entered the intended navigational destination, and the vehicle fuel information system recognized a disparity between "Miles To Empty" and "Miles To Destination." In that event, the communication system would query the nearby fuel providers 18 and assign the trajectory angle $\theta i$ as the crow's fly angle to the destination.

The host vehicle two way communication device 21A uses a regular channel to collect positional information on the fuel providers 18 equipped with DSRC in the communication area. This information, when communicated from the roadside unit 16 to the on-board unit 12 would establish a record of the other antennas in close proximity (the distance of maximum communication is estimated as being a short distance, 1000 meters radius, although messages could be relayed to further distances using the roadside units 16). This subsequent, on-going log of the fuel providers 18 equipped with DSRC in the approximate area of the host vehicle 10 provides the first-level of filtering of the fuel providers 18 in the area with whom to exchange price and other information.

Once the vehicle fuel information system makes the initial selection of potential fuel providers 18 as being "on the way" or "in the area", the vehicle fuel information system then suggests one of them depending on other factors such as price and distance as explained below. In particular, the vehicle fuel information system suggests one of the fuel providers 18 to the user via the color display unit 23A of the navigation system 23. The host vehicle two way communication device 21A switches from a regular channel to a service channel to conduct private communications with the fuel providers 18 consider to be "on the way" or "in the area" using the service channel. In other words, once the e-Handshake has been established between the fuel providers 18 consider to be "on the way" or "in the area" and the host vehicle 10, the host vehicle two way communication device 21A act as the communication link for exchanging additional information including pricing other services, desired splash screens, and payment confirmation.

Prioritization fees and basic splash screens could be negotiated between the corporations, and fee collection could be electronic (akin to Electronic Toll Collection where the gasoline station owner would have a prepaid balance from which the prioritization fee would be collected). The logic would only assess the fee in the case of equal pricing as to the user for the corporation's gain (see FIG. 9).

Figure 9:
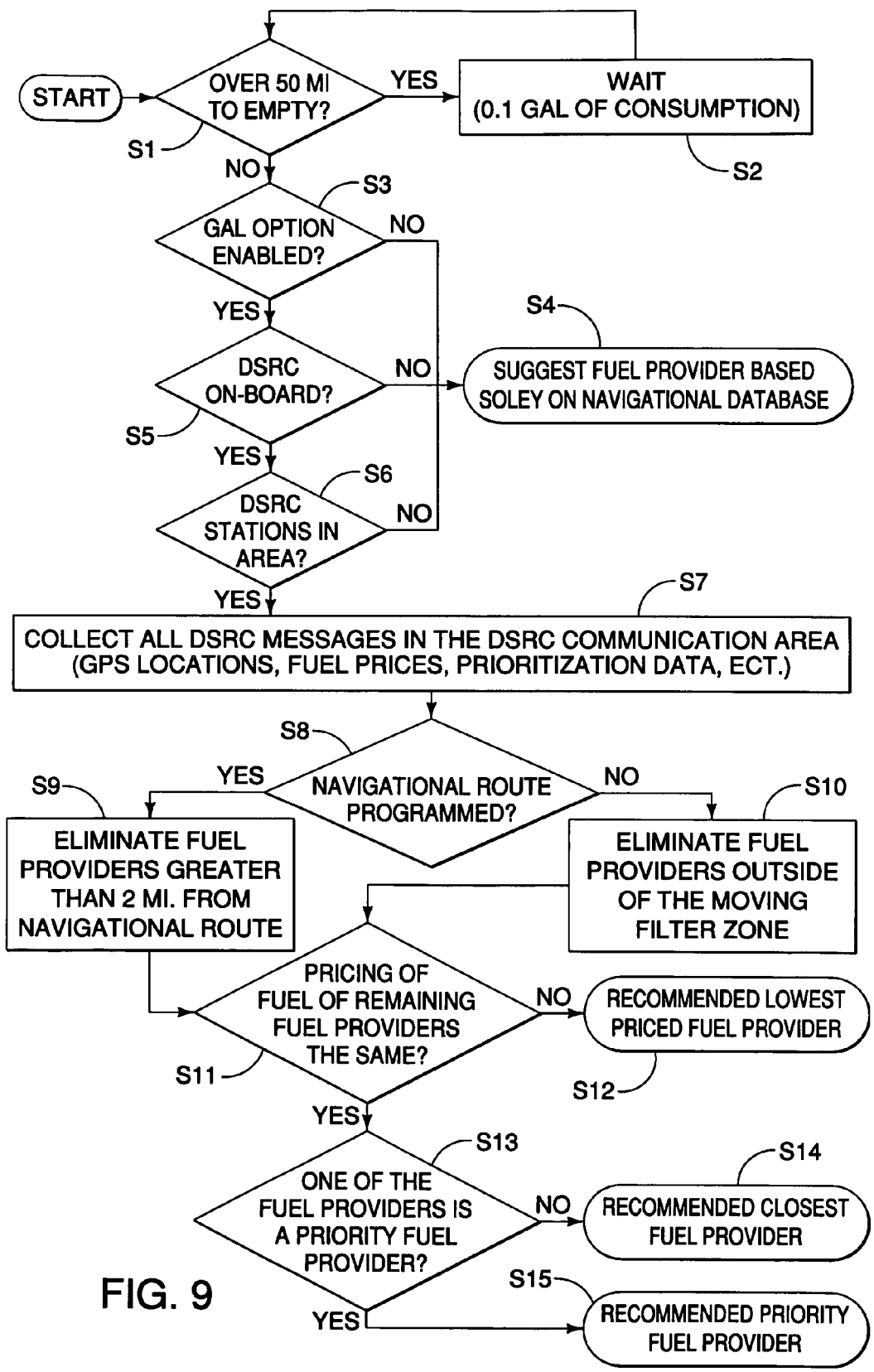
FIG. 9 is a flow chart illustrating the processing executed by the control unit to determine a low fuel situation and to select with a suggested fuel provider in accordance with the present invention.

Referring now to FIG. 9, one possible process that can be executed by the control unit 20 to carry out the present invention will now be discussed. This process of FIG. 9 is limited to the processing executed in the host vehicle 10. The control unit 20 and its various components will be typically activated when the user turns the ignition key to the "ON" position or the "Accessory" position. Thus, the ignition switch sensor 27 is configured and arranged to activate the control unit 20 and start the process of FIG. 9.

In step S1, the control unit 20 is configured to first determine if the fuel level of the fuel tank in the host vehicle 10 is below a prescribed fuel level. For example, the vehicle fuel information system could alert the navigation system 23 when the host vehicle 10 is fifty (50) miles to empty. If the fuel level of the fuel tank in the host vehicle 10 has not fallen below the prescribed fuel level, then the processing executed by the control unit 20 of the host vehicle 10 proceeds to step S2.

In step S2, the control unit 20 is configured to wait for a prescribed amount of time or a prescribed fuel consumption (e.g., 0.1 gal of fuel consumption). After the prescribed amount of time or the prescribed fuel consumption has occurred, the processing executed by the control unit 20 of the host vehicle 10 proceeds to back to step S1.

However, in step S1, if the fuel level of the fuel tank in the host vehicle 10 has fallen below the prescribed fuel level, then the processing executed by the control unit 20 of the host vehicle 10 proceeds to step S3.

In step S3, the control unit 20 is configured to determine if the Gasoline Advertisement Linkage (GAL) option has been selected (inputted) by the user into the navigation system 23. If the Gasoline Advertisement Linkage (GAL) option has not been selected, then the processing executed by the control unit 20 of the host vehicle 10 proceeds to step S4.

In step S4, the control unit 20 is configured to display a list of suggested fuel provider that is based solely on the fuel providers that are contained in the map database storage section 24 (navigational database). Thus, the user selects one of these fuel providers on the screen and the navigation system 23 will then set the selected fuel provider as the destination of the host vehicle 10 and calculate a map guiding route to the selected fuel provider. Thus, the navigation system 23 now acts as a conventional navigation system that directs the user using the color display unit 23A and/or voice commands.

However, in step S3, if the Gasoline Advertisement Linkage (GAL) option has been selected, then the processing executed by the control unit 20 of the host vehicle 10 proceeds to step S5. Alternatively, step S3 can be completely eliminated if desired.

In step S5, the control unit 20 is configured to determine if the host vehicle 10 is equipped with the two-way wireless communication system 21. If the two-way wireless communication system 21 has not been installed, then the processing executed by the control unit 20 of the host vehicle 10 proceeds to step S4, where a list of suggested fuel provider is displayed that is based solely on the fuel providers contained in the map database storage section 24 (navigational database) as discussed above.

However, in step S5, if the two-way wireless communication system 21 has been installed, then the processing executed by the control unit 20 of the host vehicle 10 proceeds to step S6.

In step S6, the control unit 20 is configured to start search for the fuel providers 18 in the approximate area of the host vehicle 10 that are equipped with DSRC. The search area can be limited to a maximum communication of the two-way wireless communication system 21 (e.g., a relatively short distance of about 1000 meters radius), or can be extended to further distances using the roadside units 16. Thus, a first-level of filtering of the fuel providers 18 in the area is made. If no DSRC equipped fuel providers 18 are located in the approximate area of the host vehicle 10, then the processing executed by the control unit 20 of the host vehicle 10 proceeds to step S4, where a list of suggested fuel provider is displayed that is based solely on the fuel providers contained in the map database storage section 24 (navigational database) as discussed above.

However, in step S6, if the control unit 20 locates one or more DSRC equipped fuel providers 18 located in the approximate area of the host vehicle 10, then the processing executed by the control unit 20 of the host vehicle 10 proceeds to step S7. Thus in step S6, the vehicle fuel information system makes an initial selection of the potential fuel providers that are considered to be "in the area".

In step S7, the control unit 20 is configured to start collecting all DSRC messages (GPS Locations, Fuel Prices, Prioritization Data, etc.) in the DSRC communication area surrounding the host vehicle 10. This can be accomplished by the host vehicle two way communication device 21A switches from a regular channel to a service channel to conduct private communications with the fuel providers 18 consider to be "on the way" using the service channel. In other words, once the e-Handshake has been established between the selected group of the fuel providers 18 consider to be "in the area" and the host vehicle 10, the host vehicle two way communication device 21A act as the communication link for exchanging additional information including pricing other services, desired splash screens, and payment confirmation.

Now, the vehicle fuel information system proceeds to S8 to begin a secondary filtering process. In particular, in step S8, the vehicle fuel information system determines a navigational route has been programmed or not.

If the user has programmed a route into the navigation system 23, then the processing executed by the control unit 20 of the host vehicle 10 proceeds to step S9, where the control unit 20 determine whether or not the fuel providers 18 are "out of the way". Here, the control unit 20 simply calculates the maximum distance from the known GPS location of the fuel providers 18 to any point along the recommended, navigational route and eliminate the fuel providers 18 from contention if the distance was above some nominal value (e.g. 2 miles).

However, in step S8, if a navigational route has not been programmed, then the processing executed by the control unit 20 of the host vehicle 10 proceeds to step S10. In step S10, when no route programmed into the navigation system 23, the control unit 20 uses a moving filter to initially select potential candidates for refueling. In the moving filter scenario, the control unit 20 of the host vehicle would look for the fuel providers 18 equipped with DSRC in the communication area, and then eliminate those fuel providers 18 that were in the opposite direction of motion. Then the control unit 20 calculates its present trajectory (given its own GPS information over time), and look for an angle less than a nominal value (e.g. $\phi=30°$).

Once the initially selected group of the fuel providers 18 that were consider to be "in the area" has been narrowed down to the fuel providers 18 that are "on the way", the processing executed by the control unit 20 of the host vehicle 10 proceeds from either S9 or S10 to step S11.

In step S11, the vehicle fuel information system then determines if the pricing of fuel of remaining fuel providers is the same or different. If the fuel pricing of remaining fuel providers is different, then the processing executed by the control unit 20 of the host vehicle 10 proceeds to step S12, where the lowest priced one of the fuel providers 18 is recommend by displaying on the screen as seen in FIG. 7.

However, in step S11, if the fuel pricing of remaining fuel providers is the same, then the processing executed by the control unit 20 of the host vehicle 10 proceeds to step S13.

In step S13, the vehicle fuel information system then determines if one of the fuel providers 18 is a priority fuel provider. In other words, the vehicle fuel information system determines if a priority fee has been paid by one or more of the fuel providers 18 so that they are given priority over the fuel providers 18 of equal fuel pricing that have not paid such a priority fee. If none of the fuel providers 18 have paid the priority fee, then the processing executed by the control unit 20 of the host vehicle 10 proceeds to step S14. In step S14, the closest of the fuel providers 18 will be recommended by displaying on the screen as seen in FIG. 7.

If on the other hand, one or more of the fuel providers 18 have paid the priority fee, then the processing executed by the control unit 20 of the host vehicle 10 proceeds to step S15. In step S15, the closest of the fuel providers 18 that have paid the priority fee will be recommend by displaying on the screen as seen in FIG. 7.

Thus, some of the advantages of the vehicle fuel information system of the present invention includes, among other things: (1) automatically alerting the user of a low fuel situation and then automatically suggesting a low cost fuel provider; (2) automatically suggesting an alternative along the route/direction of the user when a low fuel situation exists; and (3) automatically inserting a waypoint, thereby alleviating the user of the normal labor required (possibly while driving).

As used herein, the term "detect" describes an operation or function carried out by a component, a section, a device or the like including a component, a section, a device or the like that does not require physical detection, but rather includes determining, measuring, modeling, predicting or computing or the like to carry out the operation or function. The term "configured" as used herein describes a component, section or part of a device including hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle fuel informational system comprising:
   a fuel level determination component configured to determine a fuel level of a host vehicle equipped with the vehicle fuel informational system;
   an onboard vehicle positioning component configured to determine a position of the host vehicle;
   an onboard vehicle navigation component configured to process and provide vehicle route information onboard the host vehicle for a desired vehicle route of the host vehicle; and
   a low fuel notification component configured to provide a low fuel alert notification that is indicative of a low fuel and to recommend a suggested fuel provider at least partially based on at least one of the host vehicle's position and the desired vehicle route, the suggested fuel provider being chosen from a plurality of participating fuel providers such that priority of recommendation is given to those of the participating fuel providers that have paid a priority fee, the priority of recommendation being used as one criterion used in recommending the suggested fuel provider.

2. The vehicle fuel informational system according to claim 1, further comprising
   a host vehicle communication device configured to obtain information related to the participating fuel providers.

3. The vehicle fuel informational system according to claim 2, wherein
   the host vehicle communication device includes a wireless communication device.

4. The vehicle fuel informational system according to claim 2, wherein
   the low fuel notification component is further configured to recommend the suggested fuel provider based on the information relating to the participating fuel providers.

5. The vehicle fuel informational system according to claim 4, wherein
   the low fuel notification component is further configured to recommend the suggested fuel provider based on price of fuel contained in the information relating to the participating fuel providers.

6. The vehicle fuel informational system according to claim 4, wherein
   the onboard vehicle navigation component includes a display configured to view the suggested fuel provider and provide options to a user as to accept the suggested fuel provider and to ignore the suggested fuel provider.

7. The vehicle fuel informational system according to claim 1, wherein
   the onboard vehicle navigation component includes a display configured to view the suggested fuel provider, and
   the onboard vehicle navigation component is configured to recommend a route to the suggested fuel provider.

8. The vehicle fuel informational system according to claim 1, wherein
   the low fuel notification component is further configured to determine the suggested fuel provider by searching a moving area surrounding the host vehicle's position for information relating to the participating fuel providers within a prescribed distance of the host vehicle's position.

9. The vehicle fuel informational system according to claim 8, wherein
   the low fuel notification component is further configured to limit the moving area surrounding the host vehicle's position to a forward vehicle motion direction and eliminate searching in a direction opposite to the forward vehicle motion direction.

10. The vehicle fuel informational system according to claim 9, wherein
    the low fuel notification component is further configured to use an average trajectory angle relative to a longitudinal axis of the host vehicle to define the moving area surrounding the host vehicle's position.

11. The vehicle fuel informational system according to claim 1, wherein
    the low fuel notification component is further configured to determine the suggested fuel provider by searching within a prescribed distance of the desired vehicle route of the host vehicle when the desired vehicle route has been specified, and to determine the suggested fuel provider by searching a moving area surrounding the host vehicle's position for information relating to the participating fuel providers within a prescribed distance of the host vehicle's position when the desired vehicle route has not been specified.

12. The vehicle fuel informational system according to claim 11, further comprising
    a host vehicle two way communication device configured to conduct direct communications in a host vehicle broadcast area surrounding the host vehicle and obtain information relating to the participating fuel providers, with the low fuel notification component being further configured to recommend the suggested fuel provider based on the information relating to the participating fuel providers.

13. The vehicle fuel informational system according to claim 12, wherein
the low fuel notification component is further configured to recommend a closest fuel provider as the suggested fuel provider and to provide fuel pricing information relating to the closest participating fuel provider.

14. The vehicle fuel informational system according to claim 12, wherein
the low fuel notification component is further configured to recommend a low cost fuel provider as the suggested fuel provider based on price of fuel contained in the information relating to the participating fuel providers.

15. The vehicle fuel informational system according to claim 14, wherein
the low fuel notification component is further configured to recommend a closest fuel provider among the participating fuel providers having identical fuel prices when at least two of the participating fuel providers have identical fuel prices and when both or neither of the at least two of the participating fuel providers are given the priority of recommendation.

16. The vehicle fuel informational system according to claim 14, wherein
the low fuel notification component is further configured to recommend one of those of the participating fuel providers that have paid the priority fee over one of the participating fuel providers that have not paid the priority fee when the one of those of the participating fuel providers that have paid the priority fee and the one of the participating fuel providers that have not paid the priority fee have identical fuel prices.

17. The vehicle fuel informational system according to claim 12, wherein
the low fuel notification component is further configured with a low cost fuel provider mode in which a low cost fuel provider is recommended as the suggested fuel provider based on price of fuel contained in the information from the participating fuel providers and to provide traveling distance information, and a closest fuel provider mode in which a closest fuel provider is recommended as the suggested fuel provider and to provide fuel pricing information received from the closest fuel provider.

18. The vehicle fuel informational system according to claim 17, wherein
the low fuel notification component is further configured to provide a low cost fuel provider selectable list that ranks the participating fuel providers by pricing information when in the low cost fuel provider mode, and to provide a closest cost fuel provider selectable list that ranks the participating fuel providers when in the closest fuel provider mode.

19. A vehicle fuel informational system comprising:
a fuel level determination component configured to determine a fuel level of a host vehicle equipped with the vehicle fuel informational system;
an onboard vehicle positioning component configured to determine a position of the host vehicle;
an onboard vehicle navigation component configured to process and provide vehicle route information onboard the host vehicle for a desired vehicle route of the host vehicle;
a host vehicle communication device configured to obtain information related to participating fuel providers such that general location information is obtained via a broadcast channel and private data including pricing and payment confirmation information is obtained via a private service channel; and
a low fuel notification component configured to provide a low fuel alert notification that is indicative of a low fuel and to recommend a suggested fuel provider among the participating fuel providers at least partially based on at least one of the host vehicle's position, the desired vehicle route and the information obtained via the host vehicle communication device.

20. A vehicle fuel informational system comprising:
a fuel level determination component configured to determine a fuel level of a host vehicle equipped with the vehicle fuel informational system; an onboard vehicle positioning component configured to determine a position of the host vehicle;
an onboard vehicle navigation component configured to process and provide vehicle route information onboard the host vehicle for a pre-programmed vehicle travel route of the host vehicle; and
a low fuel notification component configured to provide a low fuel alert notification that is indicative of a low fuel and to recommend a suggested fuel provider among a plurality of participating fuel providers at least partially based on at least one of the host vehicle's position and the desired vehicle route such that the suggested fuel provider is located within a prescribed distance from the pre-programmed vehicle travel route.

21. The vehicle fuel informational system according to claim 1, wherein
the low fuel notification component communicates with the fuel level determination component in order to detect the low fuel and to automatically provide the low fuel alert notification and recommend the suggested fuel provider.

22. The vehicle fuel informational system according to claim 19, wherein
the low fuel notification component communicates with the fuel level determination component in order to detect the low fuel and to automatically provide the low fuel alert notification and recommend the suggested fuel provider.

23. The vehicle fuel informational system according to claim 20, wherein
the low fuel notification component communicates with the fuel level determination component in order to detect the low fuel and to automatically provide the low fuel alert notification and recommend the suggested fuel provider.

24. The vehicle fuel informational system according to claim 2, wherein
the host vehicle communication device is a two-way communication device that conducts direct communications in a host vehicle broadcast area surrounding the host vehicle.

25. The vehicle fuel informational system according to claim 20, further comprising
a host vehicle communication device configured to obtain information related to the participating fuel providers.

26. The vehicle fuel informational system according to claim 25, wherein
the host vehicle communication device is a two-way communication device that conducts direct communications in a host vehicle broadcast area surrounding the host vehicle.

* * * * *